United States Patent [19]

Harbeke

[11] Patent Number: 4,619,471
[45] Date of Patent: Oct. 28, 1986

[54] EMBEDDED PIPE COUPLING HOLDER

[76] Inventor: Gerold J. Harbeke, 2807 So. Military Trail, West Palm Beach, Fla. 33415

[21] Appl. No.: 802,277

[22] Filed: Nov. 27, 1985

[51] Int. Cl.⁴ ................................................ F16L 5/00
[52] U.S. Cl. .................................... 285/158; 285/330; 285/915; 52/221; 52/741
[58] Field of Search ................ 285/158, 64, 915, 192, 285/330; 52/221, 741

[56] References Cited

U.S. PATENT DOCUMENTS

| | | | |
|---|---|---|---|
| 3,294,358 | 12/1966 | Hagedorn | 249/175 |
| 3,346,230 | 10/1967 | Tolf, Jr. | 249/177 |
| 4,019,760 | 4/1977 | Streit | 285/158 X |
| 4,071,265 | 1/1978 | Wallace | 285/158 |
| 4,078,834 | 3/1978 | Hauff | 285/158 X |
| 4,174,126 | 11/1979 | Hauff | 285/158 |
| 4,261,598 | 4/1981 | Cornwall | 285/56 |
| 4,313,286 | 2/1982 | Harbeke | 52/220 |
| 4,427,173 | 1/1984 | MacKay | 249/39 |
| 4,453,354 | 6/1984 | Harbeke | 52/220 |
| 4,488,388 | 12/1984 | Schmidt | 285/192 X |

Primary Examiner—Thomas F. Callaghan
Attorney, Agent, or Firm—Griffin, Branigan & Butler

[57] ABSTRACT

A pipe coupling holder (10) for holding a pipe coupling joint (20) to be embedded in concrete (42) includes a cylindrically-shaped barrel member (12) having an inner wall to which the coupling joint (20) is attached at a first end thereof. The holder also includes a flange member (14), which is separate from the barrel member, but which has a hole (28) therethrough of the size for snugly receiving a fixed-shaped outer wall of the barrel member (12) to be selectively slidable along the barrel member and attachable thereto at any selected position. Thus, a second end portion (26) of the barrel member can be cut away to accommodate a raised portion (40) of a concrete form wall and the flange member (14) can be slid along the outer surface of the barrel member to the top of the raised portion. The separate flange member is then adhered in this position to the outer wall of the barrel and fastened to the raised portion of the concrete form wall to hold a pipe coupling in a fixed position during the pouring of concrete in the form.

5 Claims, 5 Drawing Figures

EMBEDDED PIPE COUPLING HOLDER

BACKGROUND OF THE INVENTION

This invention relates generally to the art of fluid-conveying pipe coupling joints which are embedded in concrete barriers, especially floors, when the barriers are formed and then coupled to pipes on opposite ends thereof for forming an integral part of a fluid flow system. More particularly, this invention concerns an apparatus and method for holding a coupling joint in a concrete floor form during a pour.

Until relatively recently, pipe networks were only extended through floors of buildings by forming holes in the floors—e.g., by using void forming devices during the "pouring" of the floors, by knocking out holes, by boring such holes after the floors were formed, etc.—and thereafter extending pipes through these holes. Normally, such holes are made to be bigger than the pipes to ensure that one can extend pipes easily through the holes. Thereafter, it is necessary for workmen to fill the spaces between the pipes and holes with cement or other substances in order to meet fire codes which generally do not allow holes in floors.

Within the last few years, there have been a number of patents issued, such as Harbeke (U.S. Pat. Nos. 4,313,286 and 4,453,354) and Cornwall (U.S. Pat. No. 4,261,598) for the concept of cementing pipe coupling joints into building barriers, such as floors, when the floors are poured and thereafter mating external pipes to female opposite ends of the embedded coupling joints. Flanges on ends of such embedded pipe coupling joints are screwed or nailed to wood forms. Such practices are normally carried out with plastic pipe, however, they could also be carried out with pipes made of other materials.

A difficulty which often arises in the use of embedded pipe coupling joints having flanges on the ends thereof for attaching the couplings to form walls is that the form walls themselves often have ridges therein and are generally not flat. In such situations, when one attaches flanges of embedded pipe coupling joints to such ridged, bumpy, or otherwise unlevel form walls, spaces are often left between the ends of the flanges and portions of the form walls. Concrete pressure forces concrete through these openings and up into the bores of the coupling joints where it later hardens. Of course before pipes can be attached to such coupling joints, the bores of the joints must be cleaned out and the bores can be damaged thereby. It is an object of this invention to provide a pipe coupling holder for holding a pipe coupling joint onto a ridged, or otherwise bumpy form in a reliable manner, so as not to allow concrete to significantly seep into the bore of the pipe coupling joint.

Another difficulty with attaching flanged pipe coupling joints to ridged or unlevel form walls is that in order to make the pipe coupling joints sit properly on the forms it would be necessary to cut the ends of the coupling joints to accommodate the form ridges. But in order to do this one would have to cut away a portion of the flange which would be difficult and which would make it impossible to use the flange on tops of ridges. Thus, it is an object of this invention to provide a pipe coupling to fit the form ridges without cutting a flange but yet which has a flange for attaching the pipe coupling holder to the tops of form ridges.

A further object of this invention is to provide a pipe coupling joint holder which is easy and inexpensive to construct and is also easy and inexpensive to use at a work site.

It is a further object of this invention to provide such a pipe coupling joint holder which is extremely flexible in use in that it can be easily used with irregularly shaped form walls having any of a variety of configurations as well as with regularly shaped form walls.

SUMMARY

Accordingly to principles of this invention, a method and apparatus for holding a pipe coupling joint to be embedded in concrete involves the use of a cylindrically-shaped barrel member in which the coupler can be fitted at a first end thereof and a separate flange member having a hole therethrough of a size for snugly receiving a fixed-shaped outer wall of the barrel member. The flange can be selectively moved along the barrel member and adhered thereto at any of selected positions. Thus, a second end of the barrel member can be cut to fit the shape of an irregular form wall with the flange being movable along the outer surface of the barrel member to be in contact with and attached to raised portions of the form wall.

BRIEF DESCRIPTION OF THE DRAWINGS

The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE DRAWINGS

Figure 1:
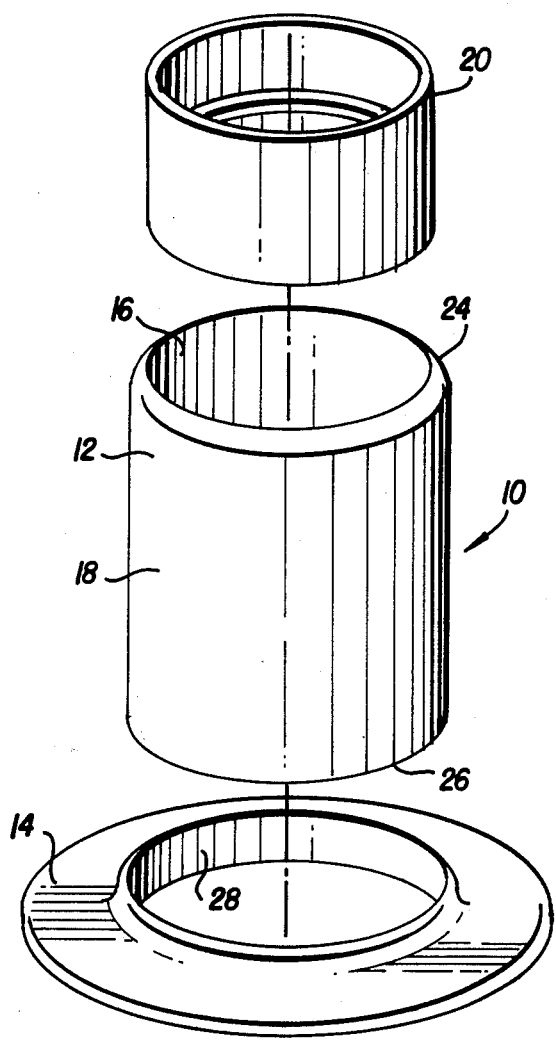
FIG. 1 is an isometric, exploded, view of a pipe-coupling joint holder of this invention including the pipe coupling joint.

Referring now to the drawings, a pipe coupling joint holder 10 comprises a barrel member 12 and a separate flange member 14. In the pipe-coupling joint holder 10 of FIG. 1, the barrel member 12 has a circular inner wall 16 and a circular outer wall 18. The length of the barrel member 12 is normally between 3 and 8 inches and its inner diameter depends upon the diameter of a pipe coupling joint 20 to be held therewith. Its thickness is about ¼ inch. In respect to its inner diameter, this is such that it snugly fits the outer diameter of the standard pipe coupling joint 20. The size of the pipe coupling joint 20, in turn, depends upon the sizes of pipes 22 (FIG. 2) one wishes to couple by the pipe coupling joint 20. The barrel member 12 is constructed of a polyvinyl chloride polymer (PVC) or acrylonitrile-butadiene-sytrene polymer (ABS) and is preferably injection molded. In the depicted embodiment, a first, upper, end 24 thereof is rounded, while a second, bottom, end 26 is blunt.

The separate flange member 14 has a circular hole 28 therein which snugly receives the fixed-shape circular outer wall 18 of the barrel member 12 so that the flange member 14 can be slid along this outer wall 18 over substantially the entire length of the barrel member 12 while remaining snug therewith. The flange member 14 is also constructed of PVC or ABS and is adherable to the outer wall of the barrel member 12 by means of an appropriate adhesive or plastic pipe welding material.

The pipe coupling joint 20 is a normal cylindrically-shaped pipe coupling joint having outer and inner cylindrical walls, with the outer cylindrical wall 30 thereof fitting snugly within the first end 24 of the circular inner wall 16 of the barrel member 12. The inner cylindrical wall 32 thereof has a ridge stop 34 therein for contacting the ends of pipes 22 inserted into the pipe coupling joint 20. The pipe coupling joint 20 is also constructed of a plastic which is adherable and/or weldable to the inner wall 16 of the barrel member 12. In the FIG. 2 embodiment, the inner wall 16 of the barrel 12 also has a ridge stop 36 to contact the lower end of the pipe coupling joint 20 for holding it in position until an adhesive hardens, however, this is not essential.

Figure 2:
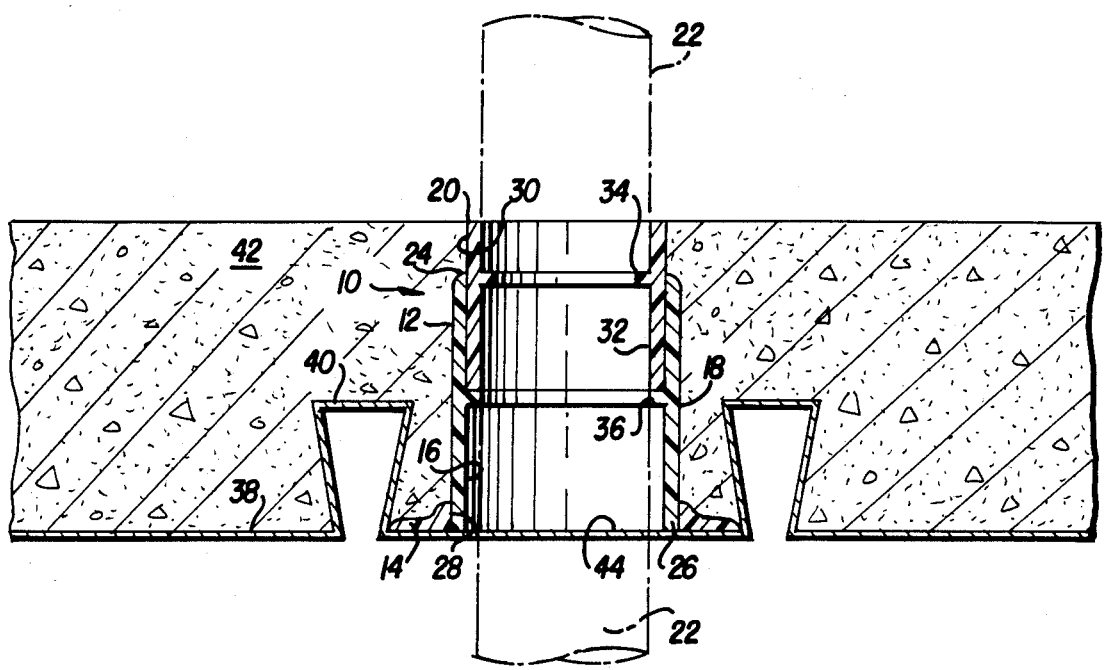
FIG. 2 is a side, partially cross-sectional view of a pipe-coupling joint holder of this invention holding a pipe coupling joint on a form with concrete being poured thereabout.

Describing now the method of using the pipe-coupling joint holder 10 with reference to a particular type of corrugated form wall 38 which has ridges 40 thereon. Such a form wall is sometimes sold under the trademark ETHECORE and is intended to be left embedded on the bottom side of a concrete slab, or floor, 42. FIG. 2 depicts the method of using the pipe coupling joint holder 10 of this invention on a flat surface between ridges 40. In this mode, the separate flange member 14 is placed between ridges 40. An adhesive or welding substance is placed on the outer circular wall 18 of the barrel member 12 near its second end 26 and this end is inserted into the hole 28 of the flange member 14 so that the barrel 12 is adhered thereto. The flange member is attached by screws or otherwise to the flat form surface 44 on which it is positioned so that the barrel member 12 is rigidly held to the corrugated form wall 38. The pipe-coupling joint 20 is then fitted into the circular inner wall 16 of the member 12 at the first end 24 and it is adhered thereto. A concrete floor 42 is then poured and allowed to harden. Once the concrete has hardened, a hole is cut in the flat surface 44 of the corrugated form 38 at the circular inner wall 16 of the barrel member 12 so that access to the pipe coupling joint 20 can be gained for inserting pipes 22 (dashed lines). It should be understood that a cover could be used to cover the upper end of the pipe coupling joint 20 during the pouring, or the pipe 22 could be adhered to the inside surface wall 32 thereof to prevent concrete from falling into the pipe coupling joint 20 from the top.

Figure 4:
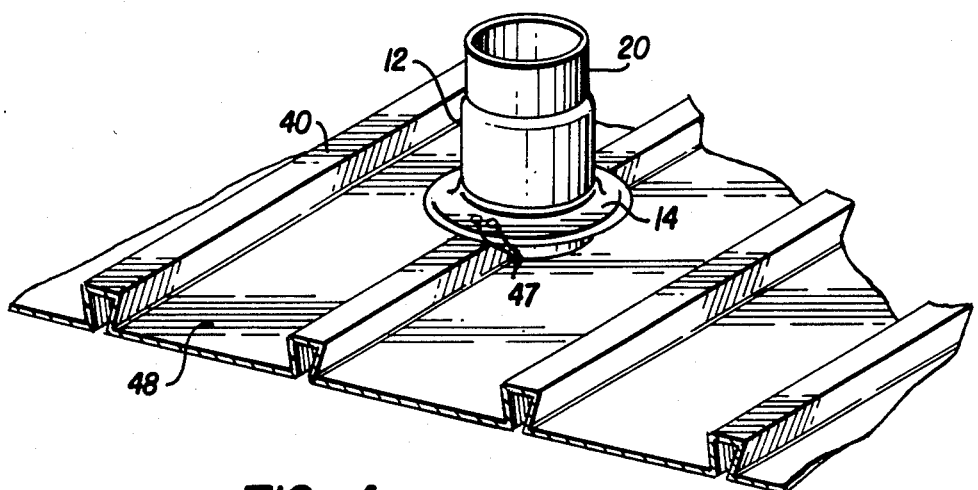
FIG. 4 is an isometric view of a pipe coupling joint holder of this invention along with a pipe coupling joint mounted on an irregular form wall; and, FIG. 5 is a side sectional view of another embodiment of the apparatus of this invention in which a pipe coupling joint is integral with a barrel of the pipe coupling holder of this invention.
Figure 3:
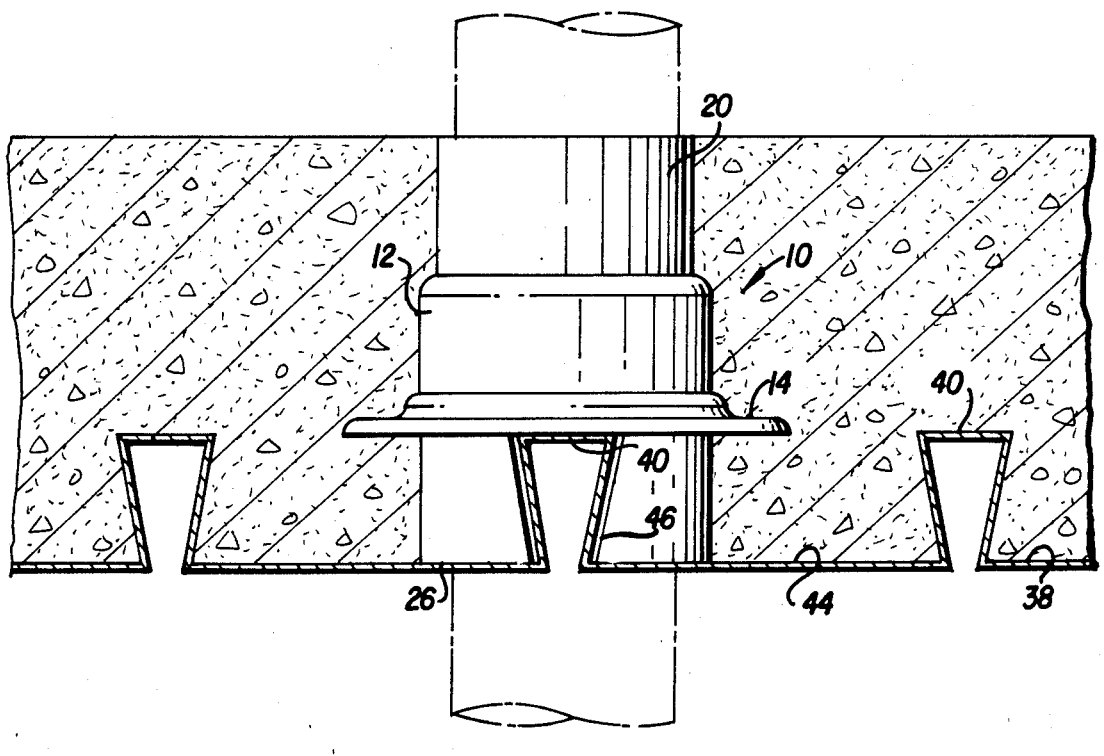
FIG. 3 is a view similar to FIG. 2, but with less being shown in cross-section, and with the pipe coupling joint holder being located at a different position on the form wall and being cut to accommodate a ridge at this new position.

FIGS. 3 and 4 depict another mode of use for the same device in which the pipe-coupling joint holder 10 is used at a ridge 40. In this case the pipe-coupling joint holder 10 is used in the same manner as it is in FIG. 2 with the exception that notches 46 (only one shown) are cut out of both sides of the barrel member 12 at its second end 26 to relatively snugly receive the ridge 40 and to allow other portions of the second end edge 26 of the barrel member 12 to contact the flat surface 44 of the corrugated form 38. In this mode, the separate flange member 14 is allowed to rise up on the outer circular wall 18 of the barrel member 12 so that it now rides on top of the ridge 40. At this point the separate flange member 14 is adhered with an adhesive to the outer wall of the barrel member 12 and it is fastened to the upper side of the ridge 40 by screws 47 to hold the barrel member 12 in firm position on the corrugated form 38. Here the pipe coupling joint 20 is mounted at the first end of the barrel member 12 in the same manner as was described in the FIG. 2 mode of using this invention.

Figure 5:
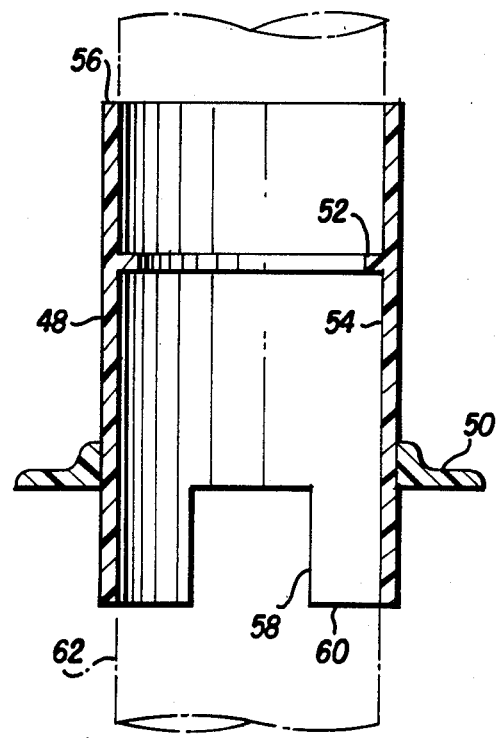

FIG. 5 depicts another embodiment of this invention wherein a composite barrel/coupler joint 48 has a separate flange member 50. In this case a ridge stop 52 is positioned on an inner wall 54 near a first end 56 of the barrel/coupler joint 48. Thus, notches 58 can be cut in a second, lower end 60 of the barrel/member joint 48 to accommodate ridges in an irregular form wall with the flange member 50 rising to the tops of the raised portions (ridges) of the form wall for attachment thereto without interfering with a coupler joint portion of this composite barrel/coupler joint 48. Pipes 62 are shown in dashed lines in FIG. 5 as they would be attached to the barrel/coupler joint 48.

It will be appreciated by those skilled in the art that the method and apparatus of this invention allows firm attachment of pipe coupling joints to an irregularly-shaped form wall using an uncut flange without allowing undue amounts of concrete to enter into a bore in which a pipe must be inserted. Further, this invention provides an uncomplicated and inexpensive manner in which pipe coupling joints can be firmly mounted to all types of forms without requiring special tools and/or equipment not readily available to those preparing forms for producing passages in building floors to accommodate pipes.

While the invention has been particularly shown and described with reference to a preferred embodiment, it will be understood by those skilled in the art that various changes in form and detail may be made therein without departing from the spirit and scope of the invention. For example, it would be possible to use such a pipe coupling holder with a metal pipe joint as well as with plastic pipe joints.

The embodiment of the invention in which an exclusive propertly or privilege are claimed are defined as follows:

1. A pipe coupling holder for holding a pipe coupling joint to be embedded in concrete to a concrete form, said pipe coupling joint having cylindrically-shaped external and internal surfaces, said internal surface including a ridge abutment therein for abutting against the ends of pipes coupled by said pipe coupling joint, said holder comprising:

an elongated, tubularly-shaped barrel member having a cylindrical inner wall of a size for snugly receiving the external surface of said pipe coupling joint at a first end of said barrel member for being engaged thereto, said barrel-member inner wall having a size that at all positions along the length of said barrel member is at least as great as the size of the inner surface of said pipe coupling joint, the outer wall of said barrel member having a fixed shape extending from an opposite second end thereof for a substantial distance along the length thereof toward said first end;

a flange member being separate from said barrel member but defining a flange hole therethrough of a size for snugly receiving the fixed-shaped outer wall of said barrel member to be selectively adhered thereto at a selected position along said barrel member;

whereby second-end portions of said barrel member can be cut away to accommodate raised portions of a concrete form wall so that said second end can be brought into contact with an unraised portion of said form wall, the flange being slidable along the outer wall of said barrel member so that it can be placed on top of said raised portion of said concrete form wall, and said flange can be adhered at this position along said outer wall of said barrel portion and fastened to the raised portion of said concrete form wall to hold said pipe coupling holder and said pipe coupling joint in position while concrete is poured into said form.

2. A pipe coupling holder as in claim 1, wherein said outer wall of said holder and the hole of said flange are circular in shape.

3. A pipe coupling holder as in claim 1, wherein said barrel member is integral with said pipe coupling joint and said pipe coupling joint therefore forms a portion of said pipe coupling holder.

4. A pipe coupling holder as in claim 1, wheren said barrel member is separate from said pipe coupling joint but is adherable thereto.

5. A method of attaching a coupling joint of a type having cylindrically-shaped external and internal surfaces, said internal surface including a ridge abutment therein for abutting against the ends of pipes coupled by said pipe coupling joint, to an irregular form wall comprising the steps of:

attaching the pipe coupling joint to a first end of an elongated, tubularly-shaped, barrel member having a cylindrical inner wall at the first end of said barrel member, said barrel-member inner wall having a size that at all positions along the length of said barrel member is at least as great as the size of the inner surface of said pipe coupling joint, the outer wall of said barrel member having a fixed shape extending from an opposite second end thereof for a substantial distance along the length thereof toward said first end;

shaping the second end edge of said barrrel member to approximately accommodate an irregular shape of the irregular form wall;

sliding a separate flange member along the outer wall of said barrel member to a position on which it lies on top of the highest raised portion of said irregular concrete form wall and attaching said flange to this raised portion, said flange member defining a hole therein for snugly receiving the fixed-shaped outer wall of said barrel member to allow it to be slid therealong; and, adhering the flange portion to the outer wall of said barrel member at its position on top of the raised portion of said form wall.

* * * * *